United States Patent
Jain et al.

(10) Patent No.: US 9,258,221 B2
(45) Date of Patent: Feb. 9, 2016

(54) SYSTEM AND METHOD FOR RAPID PROTECTION OF RSVP BASED LSP

(71) Applicant: ALCATEL-LUCENT USA, INC., Murray Hill, NJ (US)

(72) Inventors: Pradeep G. Jain, Sunnyvale, CA (US); Kanwar D. Singh, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 103 days.

(21) Appl. No.: 13/907,122

(22) Filed: May 31, 2013

(65) Prior Publication Data

US 2014/0355423 A1    Dec. 4, 2014

(51) Int. Cl.
*H04L 12/24* (2006.01)
*H04L 12/723* (2013.01)
*H04L 12/707* (2013.01)
*H04L 12/703* (2013.01)

(52) U.S. Cl.
CPC .............. *H04L 45/50* (2013.01); *H04L 45/22* (2013.01); *H04L 45/28* (2013.01)

(58) Field of Classification Search
CPC ..... H04L 41/0654; H04L 45/22; H04L 45/28; H04L 45/50
USPC .................. 370/228, 216, 217, 218, 221, 225
See application file for complete search history.

(56) References Cited

U.S. PATENT DOCUMENTS

| | | | | |
|---|---|---|---|---|
| 7,027,400 B2 * | 4/2006 | O'Neill | ................ | H04L 12/185 370/235 |
| 7,940,647 B2 * | 5/2011 | Zhang | ................ | H04L 12/5695 370/217 |
| 8,165,016 B2 * | 4/2012 | Bamba | ................ | H04J 3/085 370/228 |
| 8,279,758 B2 * | 10/2012 | Asaie | ................ | G06F 11/1443 370/241.1 |
| 8,400,935 B2 * | 3/2013 | Pelletier | ................ | H04L 5/0007 370/252 |

\* cited by examiner

*Primary Examiner* — Mark Rinehart
*Assistant Examiner* — Kenneth P Hunt
(74) *Attorney, Agent, or Firm* — Kramer & Amado, P.C.

(57) ABSTRACT

Various exemplary embodiments relate to a method performed by a network node in a resource reservation protocol (RSVP) based label switch path (LSP) network, the method including: receiving a message to establish a LSP; receiving a resv message; initiating the establishment of a backup path; determining that the establishment of the backup path failed; setting a backup timer; and initiating the establishment of a backup path upon the expiration of the backup timer.

20 Claims, 3 Drawing Sheets

SYSTEM AND METHOD FOR RAPID PROTECTION OF RSVP BASED LSP

TECHNICAL FIELD

Various exemplary embodiments disclosed herein relate generally to communication networks.

BACKGROUND

In multiprotocol label switching (MPLS) networking, a label-switched path (LSP) is a path through an MPLS network, set up by a signaling protocol such as resource reservation protocol-traffic engineering (RSVP-TE). The path is set up based on criteria in the forwarding equivalence class (FEC).

The path begins at a label edge router (LER), which makes a decision on which label to prefix to a packet based on the appropriate FEC. It then forwards the packet along to the next router in the path, which swaps the packet's outer label for another label, and forwards it to the next router. The last router in the path removes the label from the packet and forwards the packet based on the header of its next layer, for example IPv4. Due to the forwarding of packets through an LSP being opaque to higher network layers, an LSP is also sometimes referred to as an MPLS tunnel.

The router which first prefixes the MPLS header to a packet is called an ingress router. The last router in an LSP, which pops the label from the packet, is called an egress router. Routers in between, which need only swap labels, are called transit routers or label switch routers (LSRs).

RSVP-TE provides extensions to the RSVP protocol to establish backup LSP paths for local repair of LSP paths. These mechanisms enable the re-direction of traffic onto backup LSP paths in 10s of milliseconds, in the event of a failure.

Two methods are defined by the standard in RFC 4090. The one-to-one backup method creates detour LSPs for each protected LSP at each potential point of local repair. The facility backup method creates a bypass path to protect a potential failure point; by taking advantage of MPLS label stacking, this bypass path can protect a set of LSPs that have similar backup constraints. Both methods can be used to protect links and nodes during network failure. The described behavior and extensions to RSVP allow nodes to implement either method or both and to interoperate in a mixed network.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network node in a resource reservation protocol (RSVP) based label switch path (LSP) network, the method including: receiving a message to establish a LSP; receiving a resv message; initiating the establishment of a backup path; determining that the establishment of the backup path failed; setting a backup timer; and initiating the establishment of a backup path upon the expiration of the backup timer.

Various exemplary embodiments relate to a network node in a resource reservation protocol (RSVP) based label switch path (LSP) network, the network node comprising: an I/O interface configured to receive a path message and a resv message; a data storage configured to store a backup timer value; and a processor configured to: receive a message to establish a LSP; receive a resv message; initiate the establishment of a backup path; determine that the establishment of the backup path failed; set a backup timer using the backup timer value; and initiate the establishment of a backup path upon the expiration of the backup timer.

Various exemplary embodiments relate to a non-transitory computer-readable storage medium encoded with instructions executable by a processor in a network node in a resource reservation protocol (RSVP) based label switch path (LSP) network, the non-transitory computer readable storage medium including: instructions for receiving a message to establish a LSP; instructions for receiving a resv message; instructions for initiating the establishment of a backup path; instructions for determining that the establishment of the backup path failed; instructions for setting a backup timer; and initiating the establishment of a backup path upon the expiration of the backup timer.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
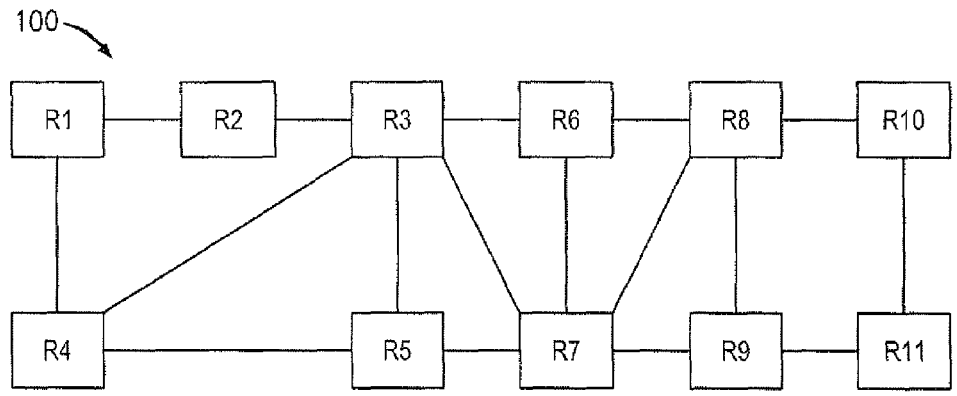
FIG. 1 illustrates a network of nodes that uses MPLS.

FIG. 1 illustrates a network of nodes that uses MPLS. The network may include nodes R1-R11 interconnected as shown. A label switched path (LSP) may be established across the network using the resource reservation protocol (RSVP). For example, a LSP may be established between an ingress node R1 and an egress node R11. The ingress node R1 may send a path message to R11. Determining the path between R1 and R11 may be found using various well known techniques. Once the path to R11 is identified, the egress node R11 may send a resv message back along the LSP to the ingress mode. As the resv message returns, the resv message may record information about each node along the path. This information may be used to determine the backup paths for each node. Each node will try to protect the links to adjacent nodes as well as the adjacent nodes. For example, in FIG. 1, a path may be established from R1 to R4 via R2 and R3. The link between R1 and R2 may be backed up by a link from R1 to R3 via R4 and R5.

As the resv message travels back along the path, each node in the path may begin to establish a backup path. During operation, the LSP may be refreshed by sending a path message that is then followed by a returning resv message. So if there is a failure of the establishment of the backup path, according the RSVP-TE protocol, the next time to establish the backup path will be during the next path refresh.

Figure 2:
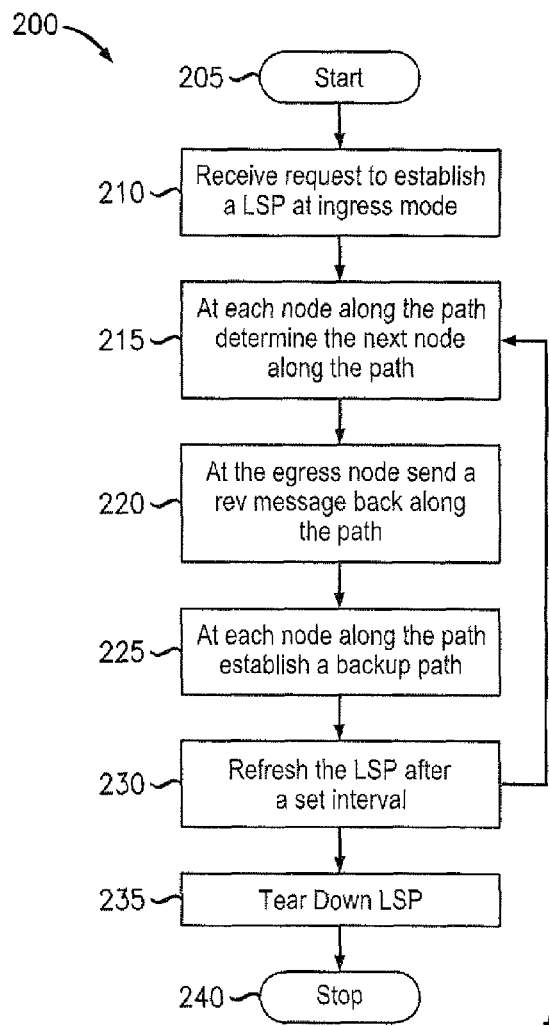
FIG. 2 illustrates a method for establishing an LSP in a MPLS network.

FIG. 2 illustrates a method for establishing an LSP in a MPLS network. The method may begin at 205. Next, an ingress node, for example R1, may receive a request to establish a LSP between R1 and R11 210. The node R1 may send a path message to R11. The nodes in the network 100 may use various well known methods in order to establish a path between R1 and R11. This may be accomplished at each node along the path by determining the next node along the path 215. Once the path is determined, the egress node may send a resv message back along the path 220. As the resv message returns to the ingress node R1, each node along the path may initiate establishment of a backup path for the node 225. Such backup path allows for continuity of the path in the event that a node is unable to use the path to communicate with adjacent nodes. Such a failure may include a node or a link failure. Next, the path may be refreshed after a set interval of time has passed 230. A timer may be used to trigger the next refresh. Also, it may be determined that the path is no longer needed, and if so, the path may be torn down 235. The method may then end at 240.

As discussed above, a timer may be used to set the refresh interval. A typical value for the refresh interval may be 120 seconds. So if a backup path fails to be established along the LSP, then there will be no backup for 120 seconds until the next refresh. This leads to a period of time where the LSP does not have protection.

This problem may be reduced by decreasing the refresh time to a lower value, say 20 seconds or even 2 seconds. The problem with this solution is that it creates network congestion and increases network overhead because of the increased number of refresh messages and resv messages. Further, each node uses more processing to process the increased number of path and resv messages.

This problem may be solved by using a timer in each node to determine how long to wait before trying to reestablish a backup path after the node fails to establish a backup path in response to the resv message. These timers would be independent of the refresh interval. The backup timer at a node may be started if the backup path fails to be established. The timer may also be started if the backup path is in use and fails. This will lead to attempts to reestablish the backup path, typically before the next path refresh.

Figure 3:
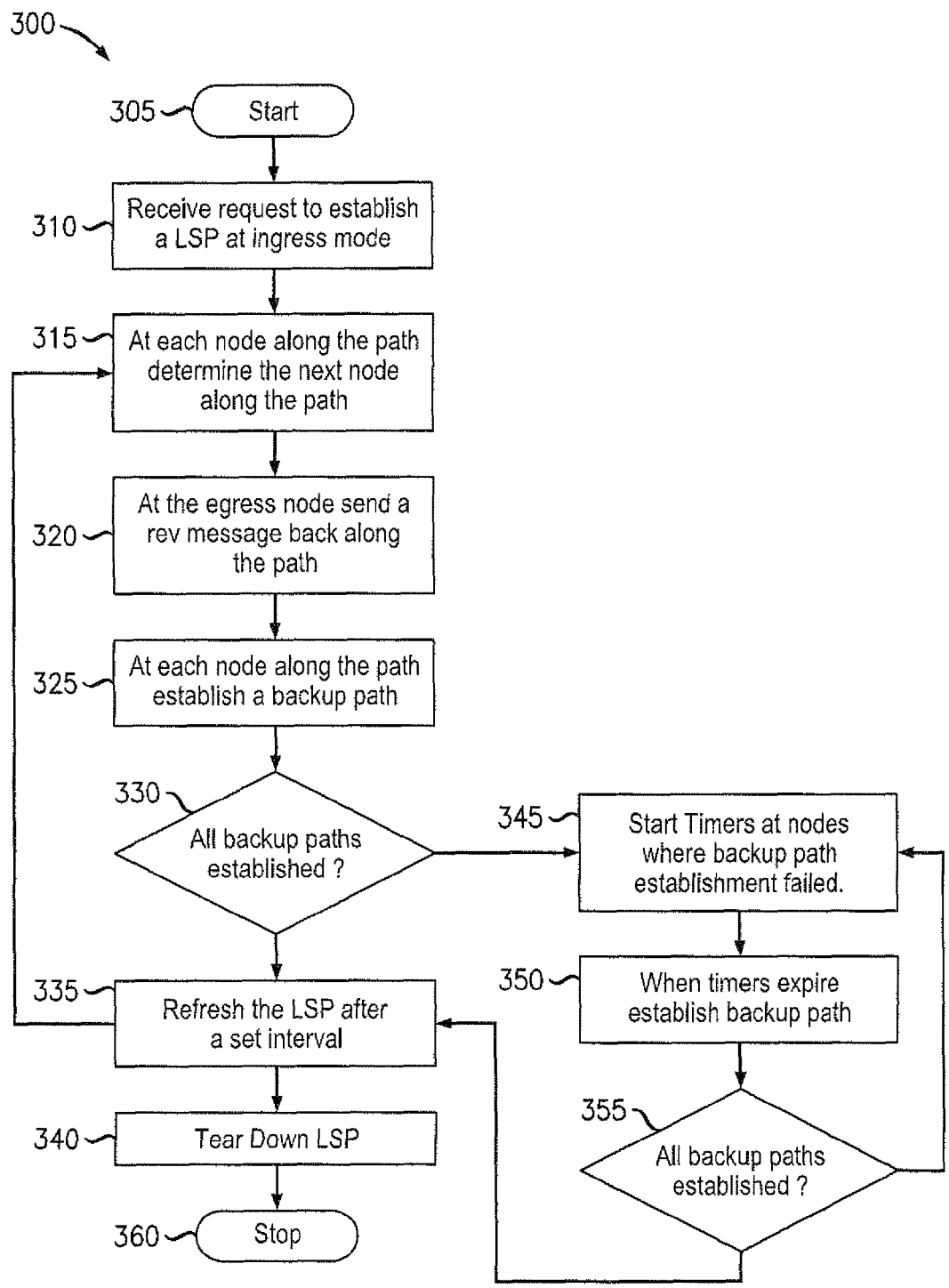
FIG. 3 illustrates a method for using a node backup timer for backup path establishment.

FIG. 3 illustrates a method for using a node backup timer for backup path establishment. The method may begin at 305. Next, an ingress node, for example R1, may receive a request to establish a LSP between R1 and R11 310. The node R1 may send a path message to R11. The nodes in the network 100 may use various well known methods in order to establish a path between R1 and R11. This may be accomplished at each node along the path by determining the next node along the path 315. Once the path is determined, the egress node may send a resv message back along the path 320. As the resv message returns to the ingress node R1, each node along the path may initiate establishment of a backup path for the node 325. Such backup path allows for continuity of the path in the event that a node is unable to use the path to communicate with adjacent nodes. Such a failure may include a node or a link failure. Next, each node determines if a backup path has been successfully established 330. If so, the path may be refreshed after a set interval of time has passed 335. A timer may be used to trigger the next refresh. Also, it may be determined that the path is no longer needed, and if so, the path may be torn down 340. The method may then end at 360.

If a backup path has not been successfully established at each node, then at the nodes where the backup was not established a timer may be started 345. When the timers expire, the nodes initiate establishment of a backup path for the nodes 350. Next, the method determines if all backup paths have been successfully established 355. If not then the method returns to 345 to restart the timers for those nodes. If so, then the method continues to refresh the path after a set interval 330.

Each node may use the same backup timer value. Alternatively, the backup timer value for each node may be set independently. The backup timer value(s) may be included in either the path. Also, the value of the backup timer may be set at each node based upon rules. Such rules may include considering such factors as the path refresh interval, path complexity, node reliability, node priority, etc. For example, the backup timer value may vary proportionally to the refresh interval, that is, as the refresh interval increase/decreases, the backup timer value may increase/decrease respectively. If the backup paths for a node are complex, a shorter timer may be desired, as it may take more time to establish a complex path. Also, if an adjacent node or link is unreliable, then the backup timer interval may be shorter. Finally, if a node has a high priority, then the backup timer interval may be set to a shorter value.

Figure 4:
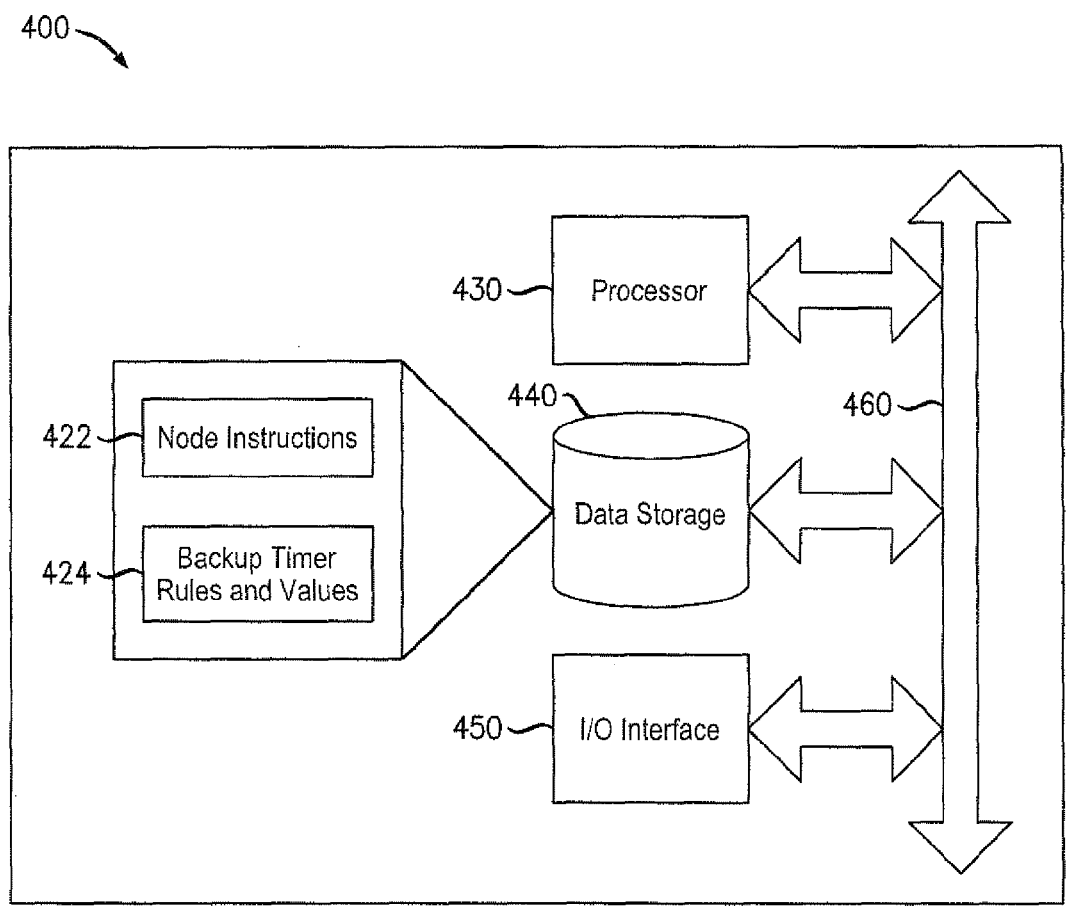
FIG. 4 illustrates an embodiment of a network node.

FIG. 4 illustrates an embodiment of a network node. The network node 400 may be the same as the nodes R1-R11. The network node 400 may include a processor 430, data storage 440, and I/O interface 450, and an I/O communication channel 460.

The processor 430 may control the operation of the network node 400 and cooperate with the data storage 440 and the I/O interface 450, via a system bus. As used herein, the term "processor" will be understood to encompass a variety of devices such as microprocessors, field-programmable gate arrays (FPGAs), application-specific integrated circuits (ASICs), and other similar processing devices.

The data storage 440 may store program and other data such as various programs and data useful in implementing the functions described above. For example, the data storage 440 may store network node instructions for performing various functions carried out by the network node. The data storage 440 may also store backup timer rules and timer data 424. The timer rules and timer data 424 may be used as described above with respect to FIG. 3.

The I/O interface 450 may cooperate with the processor 430 to support communications over one or more communication channels. For example, the I/O interface 450 may include a user interface, such as a keyboard and monitor, or a network interface, such as one or more Ethernet ports. The I/O communication channel 460 may include various types of communication protocols and physical layers in order to manage the network.

In some embodiments, the processor 430 may include resources such as processors or CPU cores, the I/O interface 450 may include any suitable network interfaces, or the data storage 440 may include memory or storage devices such as magnetic storage, flash memory, random access memory, read only memory, or any other suitable memory or storage device. Moreover the network node 400 may be any suitable physical hardware configuration such as: one or more server (s), blades consisting of components such as processor, memory, network interfaces or storage devices.

It should be apparent from the foregoing description that various exemplary embodiments of the invention may be implemented in hardware and/or software instructions enacted on a processor. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node in a resource reservation protocol (RSVP) based label switch path (LSP) network, the method comprising:
   receiving a message to establish a LSP specifying a refresh interval for the LSP;
   receiving a resv message for the LSP;
   initiating the establishment of a backup path for the LSP;
   setting a backup timer based on a backup timer value that is determined based on locally preconfigured data at the network node that is independent of the refresh interval specified by the message; and
   reinitiating the establishment of a backup path for the LSP upon the expiration of the backup timer.

2. The method of claim 1, wherein the message to establish a LSP is a path message.

3. The method of claim 2, further comprising refreshing the LSP after a set interval by receiving another path message.

4. The method of claim 1, wherein the backup timer value is determined using backup timer value rules locally predefined at the network node.

5. The method of claim 1, further comprising determining the next node along the LSP.

6. The method of claim 1, further comprising:
   receiving a message to tear down the LSP; and
   tearing down the LSP in the network node.

7. The method of claim 1, wherein the message to establish a LSP is a request to establish a LSP and wherein the network node is an ingress network node.

8. A network node in a resource reservation protocol (RSVP) based label switch path (LSP) network, the network node comprising:
   an input/output (I/O) interface configured to receive a path message and a resv message;
   a data storage configured to store data for determining a backup timer value; and
   a processor configured to:
      receive a message to establish a LSP specifying a refresh interval for the LSP;
      receive a resv message for the LSP;
      initiate the establishment of a backup path for the LSP;
      set a backup timer using the backup timer value, wherein the data for determining the backup timer value is independent of the refresh interval specified by the message; and
      reinitiate the establishment of a backup path for the LSP upon the expiration of the backup timer.

9. The network node of claim 8, wherein the message to establish a LSP is a path message.

10. The network node of claim 9, wherein the processor is further configured to refresh the LSP after a set interval by receiving another path message.

11. The network node of claim 8, wherein the data comprises backup timer value rules locally defined at the network node.

12. The network node of claim 8, wherein the processor is further configured to determine the next node along the LSP.

13. The network node of claim 8, wherein the message to establish a LSP is a request to establish a LSP and wherein the network node is an ingress network node.

14. The network node of claim 8, wherein the processor is further configured to:
   receive a message to tear down the LSP; and
   tear down the LSP in the network node.

15. A non-transitory computer-readable storage medium encoded with instructions executable by a processor in a network node in a resource reservation protocol (RSVP) based label switch path (LSP) network, the non-transitory computer readable storage medium comprising:
   instructions for receiving a message to establish a LSP specifying a refresh interval for the LSP;
   instructions for receiving a resv message for the LSP;
   instructions for initiating the establishment of a backup path for the LSP;
   instructions for setting a backup timer based on a backup timer value that is determined based on locally preconfigured data at the network node that is independent of the refresh interval specified by the message; and
   instructions for reinitiating the establishment of a backup path for the LSP upon the expiration of the backup timer.

16. The non-transitory computer-readable storage medium of claim 15, wherein the message to establish a LSP is a path message.

17. The non-transitory computer-readable storage medium claim 15, wherein the message to establish a LSP is a request to establish a LSP and wherein the network node is an ingress network node.

18. The method of claim 1, wherein the locally preconfigured data is a value for use as the backup timer value.

19. The network node of claim 8, wherein the data for determining the backup timer value comprises a value for use as the backup timer value.

20. The non-transitory computer-readable storage medium claim 15, wherein the locally preconfigured data is a value for use as the backup timer value.

* * * * *